(12) United States Patent
Moser

(10) Patent No.: US 7,480,767 B2
(45) Date of Patent: Jan. 20, 2009

(54) CACHE WITH TIME-BASED PURGING AND COMPUTATION OF PURGED ITEMS

(75) Inventor: Martin Moser, Speyer (DE)

(73) Assignee: SAP AG, Walldorf (DE)

( * ) Notice: Subject to any disclaimer, the term of this patent is extended or adjusted under 35 U.S.C. 154(b) by 237 days.

(21) Appl. No.: 11/424,482

(22) Filed: Jun. 15, 2006

(65) Prior Publication Data

US 2007/0294480 A1    Dec. 20, 2007

(51) Int. Cl.
*G06F 12/12* (2006.01)
(52) U.S. Cl. .................. 711/133; 711/134; 711/135; 711/159; 711/160; 707/206
(58) Field of Classification Search ......... 711/133–135, 711/159–160; 707/206
See application file for complete search history.

(56) References Cited

U.S. PATENT DOCUMENTS 6,807,607 B1 *   10/2004   Lamparter .................. 711/133

2007/0156966 A1 *   7/2007   Sundarrajan et al. ......... 711/133

OTHER PUBLICATIONS http://www.cs.wustl.edu/~schmidt/ACE_wrappers/ace/Caching_Strategies_T.h, Kirthika Parameswaran, "Caching_Strategies_T.h", Nov. 9, 2005.

* cited by examiner

*Primary Examiner*—Jasmine Song
(74) *Attorney, Agent, or Firm*—Mintz, Levin, Cohn, Ferris, Glovsky & Popeo, P.C.

(57) ABSTRACT

Methods and apparatus, including computer program products, for purging an item from a cache based on the expiration of a period of time and having an associated process to generate an item purged from the cache. A program stores a first item in a cache with an indication of a process to generate the first item, schedules a validity period for the first item, and purges the first item from the cache when the validity period has expired. The validity period may be optimized to be less than a period of time after which the first item would be promoted from a first generation of the cache to a second generation of the cache and invalid objects in the first generation of the cache are freed from memory more frequently than invalid objects in the second generation of the cache.

16 Claims, 3 Drawing Sheets

US 7,480,767 B2

CACHE WITH TIME-BASED PURGING AND COMPUTATION OF PURGED ITEMS

BACKGROUND

The present disclosure relates to data processing by digital computer, and more particularly to time-based purging of a cache having computation of purged items.

In general, a cache may be used to store items for an indefinite period of time, where, the items in cache tend to be fetched faster from the cache than were the items to be computed again. For example, in some implementations of a cache for JAVA, a user programmer may store an item in a cache with an expectation that, when the item is desired to be retrieved, the item might not be in the cache; however, should the item be available, it might be accessed quicker than were it to be re-computed (e.g., read from a network, calculated from a function, and the like).

SUMMARY

The present disclosure provides methods and apparatus, including computer program products, that implement techniques for purging items in a cache based on an expiration of a period of time and having a cache to compute purged items.

In one general aspect, a program stores a first item in a cache with an indication of a process (e.g., a name of a function) to generate the first item, schedules a validity period for the first item, and purges the first item from the cache when the validity period has expired. In that program, the validity period is optimized to be less than a period of time after which the first item would be promoted from a first generation of the cache to a second generation of the cache and invalid objects in the first generation of the cache are freed from memory more frequently than invalid objects in the second generation of the cache.

In another aspect, a program stores a first item in a cache with an indication of a process to generate the first item, schedules a validity period for the first item, and purges the first item from the cache in response to a determination to purge the first item from the cache. In that program, the validity period defines a time interval during which the first item is to be retained in the cache so long as there is sufficient free space available to retain the first item.

In another aspect, a program initiates storage of a first item in a cache with an indication of a process to generate the first item and purges the first item from the cache in response to a determination to purge the first item from the cache. In that program, a validity period associated with the first item defines a time interval during which the first item is to be retained in the cache so long as there is sufficient free space available to retain the first item. The determination to purge the first item from the cache is based on the expiration of the validity period.

In another aspect, a program stores a first item in a cache with an indication of a process to generate the first item, schedules a validity period for the first item, and purges the first item from the cache when the validity period has expired.

In another aspect, a cache table is structured to include cache entries where items associated with the cache entries have an associated validity period and an associated process to generate the items (e.g., a function associated with a cache entry).

Implementations may include one or more of the following features in some variations. Purging the first item from the cache may include setting a value associated with the cache entry to null. The first item may be generated if a cache entry associated with the first item indicates that the first item is not cached.

A number of accesses to an item in the cache may be tracked and an item may be purged if the number of accesses for the item is below a threshold number. An item may be retained in cache if a validity period expires and a number of accesses to an item in the cache is above a threshold.

The program may determine whether the validity period has expired. Determining whether the validity period has expired may include determining whether a first time has passed, where the first time is associated with a time at which the validity period may be scheduled to end.

Scheduling a validity period may include setting a timer to indicate when to purge the first item from the cache, where the validity period is a period from when the timer was set, to a time when the timer expires. The optimization of the validity period may be based on test results of an amount of time when at least a certain amount of items (e.g., 50% of items tested) are promoted from the first generation to the second generation.

The program may be a front-end to the cache. The first item may be a soft-reference to data or a value. The program may be compatible with the JAVA Archive file format.

The cache may be implemented to run in a JAVA Runtime Environment and the first generation of the cache may correspond to a new generation of heap memory and the second generation may correspond to an old generation of heap memory.

A cache management system may be associated with the cache table. The cache management system may be used to receive requests to store items in a cache and return items from the cache. If an item is not in the cache, the cache management system may generate the item, using a function associated with the item, and return the generated item. The cache management system may be a front-end to another cache management system (e.g., a legacy cache management system).

The subject matter disclosed herein can be implemented to realize one or more of the following advantages. Cached items can be purged from a cache based on the expiration of a time period such that the memory for all or some of the items may be freed more efficiently. For example, in a JAVA-compliant runtime system, garbage collection may be divided into a minor garbage collection process corresponding to a new generation (also referred to as a young generation) of a heap and a major garbage collection (also referred to as a full garbage collection) process corresponding to all generations of a heap. Items in the cache may initially be stored in the first generation and may be promoted to the second generation over time if they are still valid (e.g., still cached). To have the memory of many or all cached items freed during one or more minor garbage collections, as opposed to a major garbage collection, the time period of a validity period may be optimized such that cache entries are purged before they may be promoted to the second generation. Thus, if minor garbage collection were to occur more frequently and require less resources to perform, optimizing the validity period may improve the performance of the cache by, as examples, clearing memory associated with cache entries more frequently while using less resources.

A function for generating a value of an entry may be associated with an item that has been requested to be cached. And, if an item is not in cache, the function can be used to automatically generate the item and return the item as if it were in the cache. Advantageously, a user programmer need not worry about instances where an item put in cache is no longer in a cache, as the item is generated for the user programmer, in a process that is hidden from to the user programmer. Thus, rather than explicitly checking a cache for an entry and computing the value when no entry is found, a programmer may use one function to access the value (e.g., a get method). The function may shield the programmer from the cache check, as well as from placing a value in the cache after computation. To set-up an item in the cache, a programmer may simply call a function to put an item in a cache with an expiration value and a computation function. Further, instance pooling may be handled transparently to the programmer, such that memory may be efficiently pooled for a programmer in combination with providing an easy interface for accessing cached items. This combination may provide a degree of separation from a programmer and details of a cache that greatly simplifies management of memory resources for the programmer.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
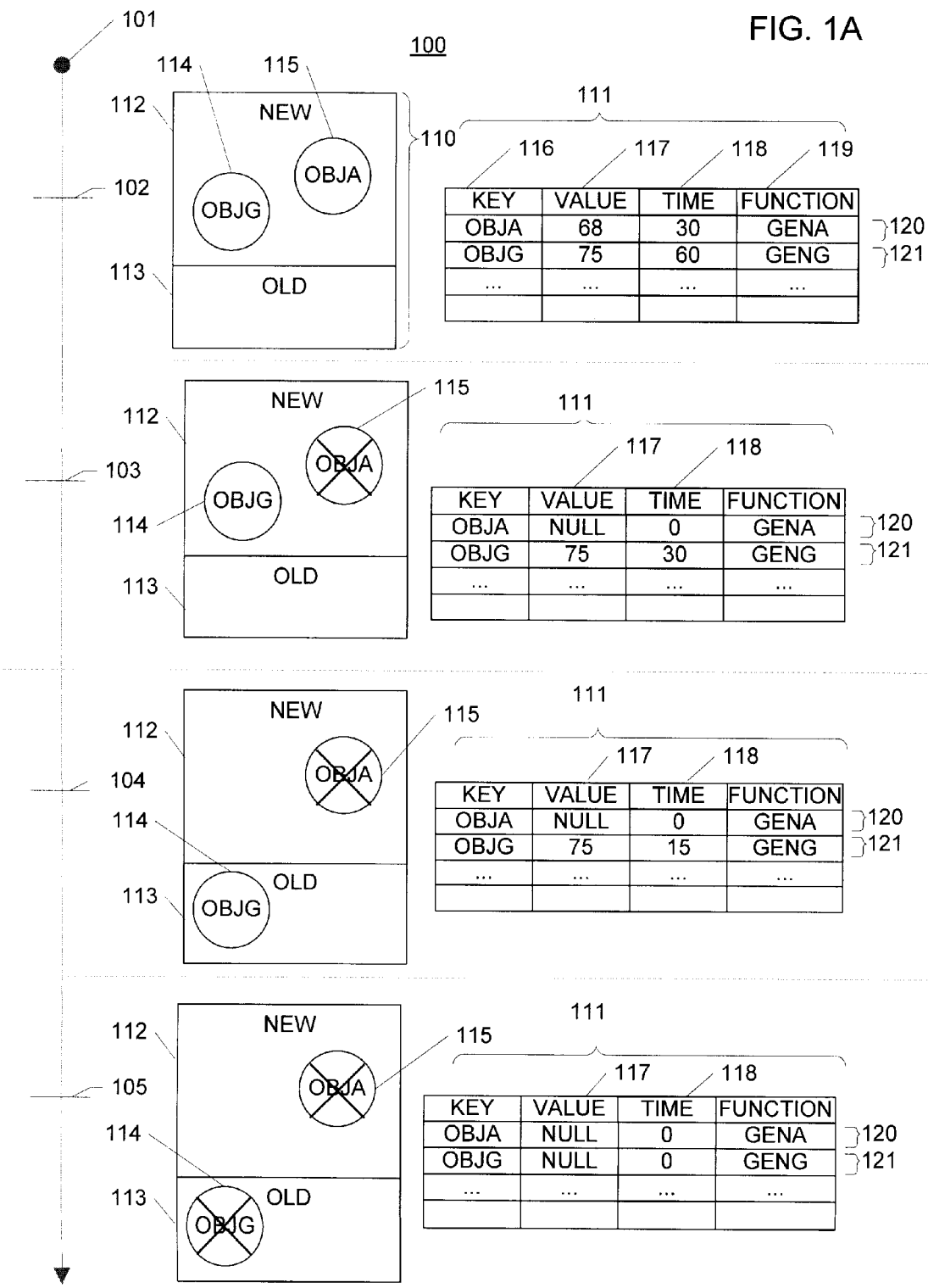
FIGS. 1A-1B are a diagram of a cache and a cache table over time.
Figure 1B:
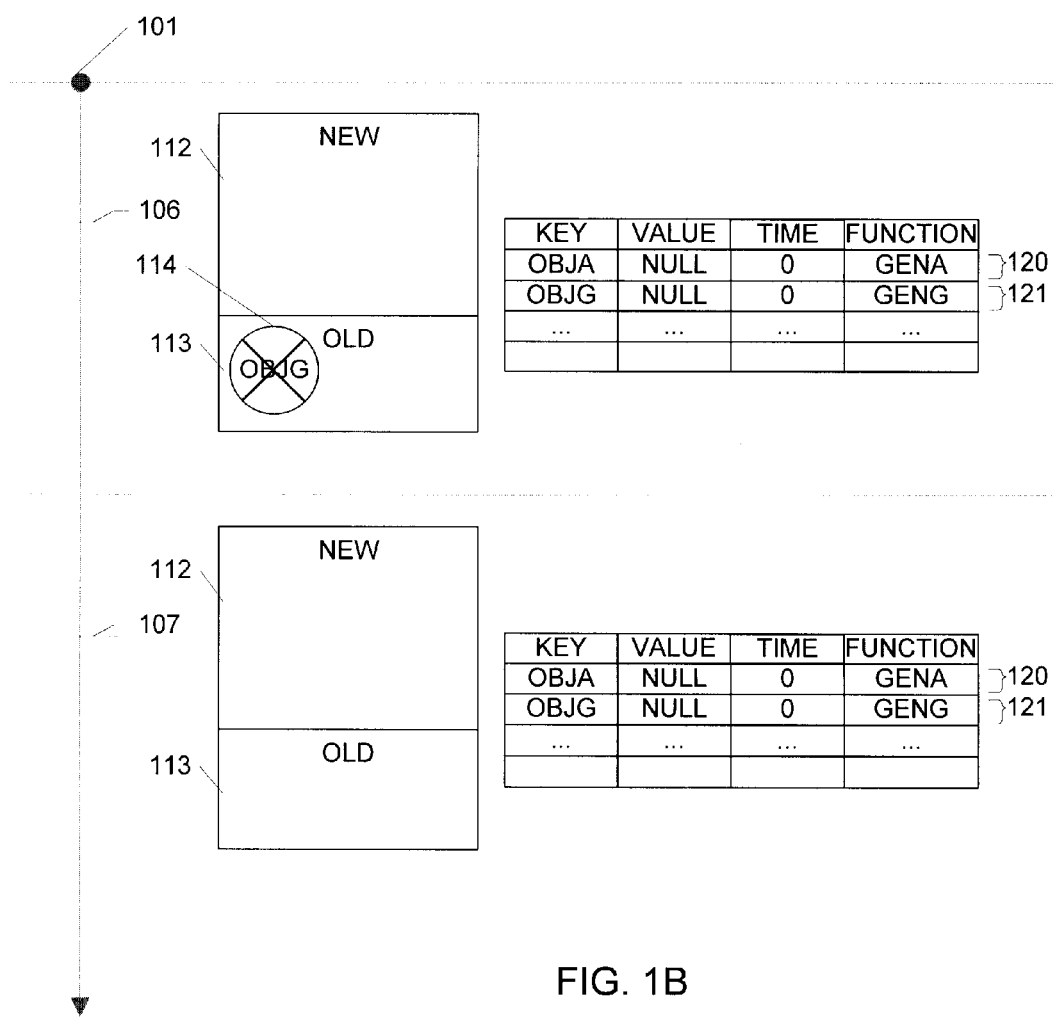

FIGS. 1A-1B are a diagram 100 of a cache 110 and a cache table 111 over time. The following description of the cache 110 and the cache table 111 is explained with reference to an implementation designed for a JAVA runtime system, although other implementations can be implemented in other languages for other runtime systems that may have different architectures. The description traces a history of the cache 110 and cache table 111 over time, as represented by the timeline 101 and the time markers 102-107. Broken lines are used to separate the different states of the cache 110 and the cache table 111 over time.

The cache 110 is implemented in a generational heap that includes a new generation 112 and an old generation 113. When an item is initially stored in the cache 110, an item is considered to be in the new generation 112. For example, the items OBJA 115 and OBJG 116 are stored in the new generation 112. After a period of time, items in the new generation are promoted to the old generation 113. For example, the item OBJG 114 is promoted to the old generation 113 over time (103-104). When garbage collecting invalid items, items in the new generation 112 are collected during a minor garbage collection process while items in the old generation 113 are collected during a major garbage collection process (with items in the new generation 112). In general, minor garbage collection tends to occur more frequently than major garbage collection; thus, items in the new generation 112 tend to have their respective memory freed more frequently than items in the old generation 113.

The cache table 111 includes a representation of cache entries 120-121 as rows. Columns 116-119 in the cache table 111 represent an organization of different values in the cache table 111 for each cache entry. The columns 116-119 in the cache table 111 include a column for keys 116, a column for values 117, a column for time 118, and a column for functions 119. The keys represent a way to identify cache entries, the values represent a value corresponding to a cached item, the time represents a time remaining (e.g., time in seconds) for a validity period of a cache entry, and the functions represent a reference to a function (e.g., a process) to compute a value corresponding to a cache entry (e.g., if an item is not cached, the function can be used to generate the item and have the generated item cached). For example, the cache entry 120 corresponding to the cached item OBJA 115 has entries including, a key "OBJA," a value 68, a time of 30, and a function named "GENA."

Although the cache table 111 has a certain structure with certain types of entries, other structures may be used to represent cache entries and other types of entries for cached entries may be used. In some implementations, this may include a column for keys, a column for soft-references to items (e.g., a pointer), a column for timers (e.g., a reference to a timer object that is used by a runtime system scheduler to schedule tasks), and a column for functions.

As discussed above, the diagram 100 illustrates a history of the cache 110 and the cache table 111. In the following description of the state of the cache 110 and the cache table 111, the ordinal numbers first, second, and the like will be used to describe the chronological series of time along the timeline 101; however, in other parts of the application, ordinal numbers need not correspond to chronological ordering. For example, a first time need not occur before a second time.

At a first time (102) in the timeline 101, the cache 110 is storing two items, OBJG 114 and OBJA 115. In the cache table 111, the keys correspond to the names of the items. For example, the item OBJG 114 has a key of "OBJG."

Items OBJG 114 and OBJA 115 have different validity periods, as indicated by the different amounts of time (30 and 60, respectively) in the cache table 111. The validity periods represented by the time in the cache table 111 are periods during which a cached item might be valid before it is purged from the cache 110. Thus, at the end of a validity period, an item might be purged from the cache 110. However, a cached item may be purged from a cache at an earlier time. For example, if the cache 111 is full, any of various cache replacement schemes may cause an item to be purged from the cache before a validity period expires.

At a second time (103), the item OBJA 115 is purged from the cache because the validity period has expired. The expiration of the validity period may be determined from the time 0 in the cache table 111, under the column for time 118 in the cache entry 120 corresponding to the item OBJA 115. The cache table 111 indicates the item OBJA 115 has been purged by setting the corresponding value (in the column for values 117) to "NULL."

At a third time (104), the item OBJG 114 is promoted from the new generation 112 to the old generation 113. The item OBJG 114 may have been promoted because the item was in the cache for a predetermined amount of time, after which, items are promoted from the new generation 112 to the old generation 113. The amount of time before an item is promoted might vary, such that it is unpredictable but tends to occur after a certain time.

At a fourth time (105), the item OBJG 114 is purged from the cache because the validity period has expired. Similar to the expiration of the validity period for the item OBJA 115, the validity period for the item OBJG 114 may be determined from the time 0 in the cache table 111, under the column for time 118 in the cache entry 121. Also, the cache table 111 indicates the item OBJG 114 has been purged by setting the corresponding value in the column for values 117 to "NULL."

At a fifth time (106), a minor garbage collection is performed. Minor garbage collection frees memory corresponding to invalid items in the new generation 112. However, minor garbage collection does not free the memory corresponding to invalid items in the old generation 113. Thus, the item OBJG 114 still resides in the old generation 113.

At a sixth time (107), a major garbage collection is performed. In contrast to minor garbage collection, major garbage collection frees memory associated with items in both the new and old generations 112, 113.

In some runtime systems, such as some JAVA runtime systems, there may be generational caching of items, where minor garbage collection may be performed more frequently than major garbage collection. Consequentially, if a validity period is optimized such that items tend to be purged from cache before they are promoted to an older generation, where items are only freed from memory less frequently, system performance may improve.

Although the cache 110 is implemented in a heap with two generations, in some implementations a heap might not be used, there might be no division of generations, or there may be more than two generations (e.g., three generations with any number of processes for freeing memory of objects in the various generations).

Although not shown, in subsequent accesses to the cache 110 the functions 119 may be used to generate an item for a cached item that has been purged (e.g., for a cache entry that has had a corresponding value set to NULL). The item that is generated may be stored in the cache entry from which it was purged and an associated timer may start for the cache entry. For example, after the sixth time (107) the item corresponding to the key OBJG may be requested and, after a look-up in the table 111, the table may be determined to have a NULL value corresponding to the key OBJG. Because the value is NULL and the item has been requested, a function corresponding to the second cache entry 121 may be used to generate the item automatically (e.g., in a manner transparent to a user of the cache), and the generated item may be returned to a user of the cache, the generated item may be used to populate the second cache entry 121, and a timer corresponding to the second cache entry 121 may start (e.g., a new time may be set in the time column 118).

In some implementations, caching may further include mechanisms and techniques for counting a number of accesses to a cache entry and renewing a timer, rather than purging a cached item, when a timer expires if the number of accesses to the cache exceeds a threshold. For example, a threshold number of accesses for retaining an item in a cache may be three and a cache entry may have an associated number of accesses tracked by a column of values in a cache table representing a number of accesses for each cache entry. When an item is initially stored in a cache, or, if an item is stored in a cache after being purged, the number of accesses to the cache entry may be initialized as one (or zero, for example). On subsequent accesses to the cached item (e.g., each time a get( ) method is called), the number of accesses to the cache entry may be incremented. Then, if a timer corresponding to the cache entry expires and the number of accesses was less than the threshold value three, the item may be purged from the cache (e.g., a reference to the item may be set to NULL). However, if the number of accesses was greater than three, the item may be retained in the cache, a corresponding timer may be renewed (e.g., the time entry in the cache table 111 may have a value of 60), and the number of accesses may be initialized to one. By using a threshold number of accesses to determine whether to purge cached items upon expiration of a timer, items that are frequently accessed may be maintained in a cache in favor over items that are not frequently used. Also, in combination with other features, such as a function for automatically generating a purged item, the use of the threshold may prevent a frequently-used item from being frequently computed were the item to otherwise be purged each time a timer expires without the use of a threshold that may be used to determine whether to maintain an item in cache.

Mechanisms other than a column of values in a cache table may be used to track a number of accesses to a cache entry. For example, a timer task for a cache entry may include a count for a number of accesses to a cache entry and the timer task may be renewed if the number of accesses exceeds the threshold. As another example, a JAVA object for a cache entry may include an attribute "count." Although each cache entry 120, 121 of FIGS. 1A-1B has an associated function, in various implementations, each cache entry of a cache need not have an associated function and automatic generation of a purged item may only be performed for those items that have an associated function.

Figure 2:
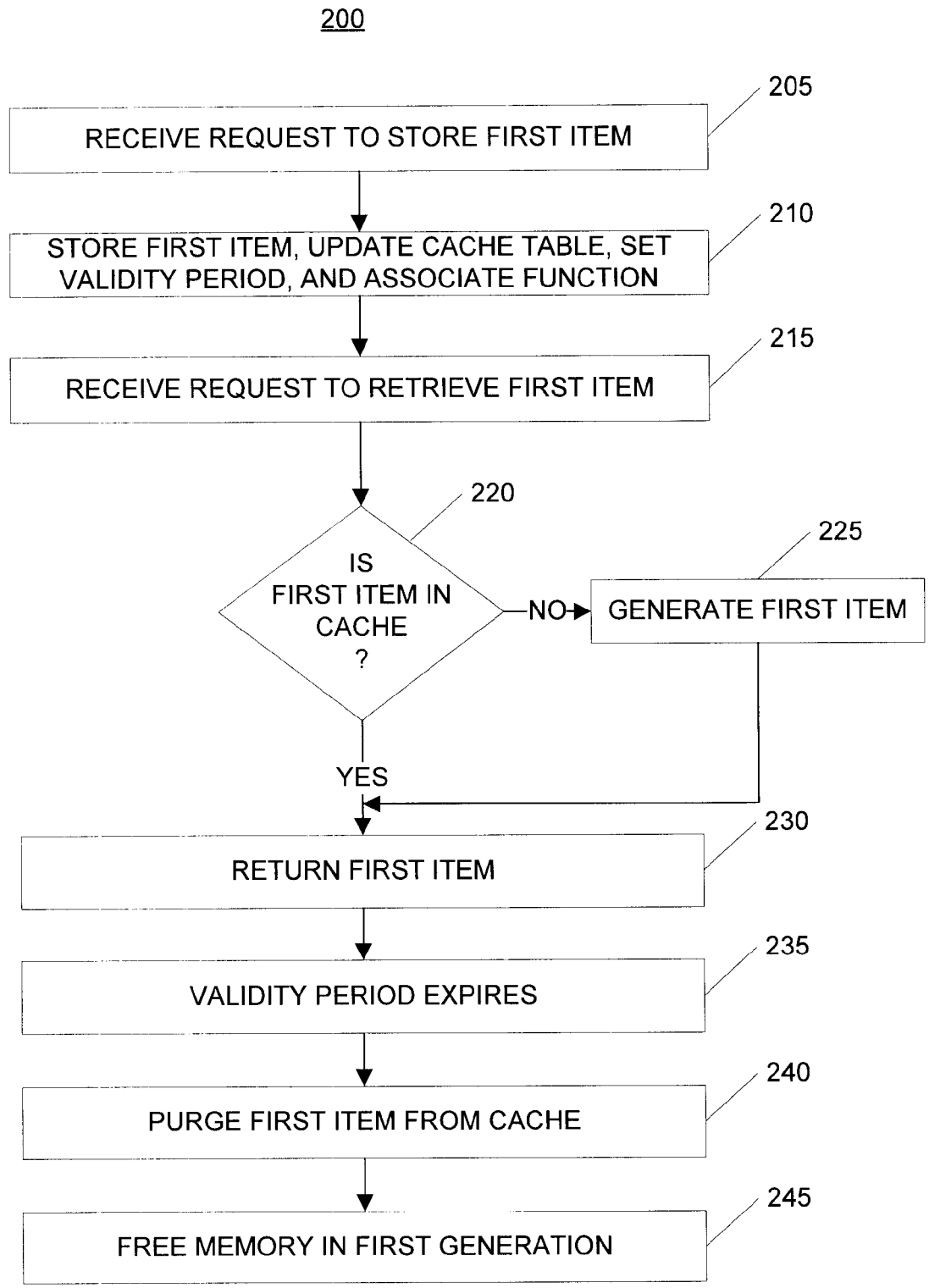
FIG. 2 is a flowchart illustrating a life cycle of an item that is cached.

FIG. 2 is a flowchart 200 illustrating a life cycle of an item that is cached. In general, the item that is cached is cached in a system that sets a validity period for items. After a validity period expires, the item is to be removed from the cache. However, the validity period does not necessarily ensure the item is in cache. For example, a cache replacement scheme may result in purging the item from cache before the validity period expires. The item that is cached may be one of the items OBJA 115 or OBJG 114 of FIGS. 1A-1B, and, the item may be cached in a runtime system having a similar cache architecture to the cache 110 and the cache table 111 of FIGS. 1A-1B.

At the beginning of a life cycle of a first item, a request to cache the first item is received (205). The request may be received at a component that manages cache, and referred to as a cache management system. The cache management system may be integrated with a runtime system (e.g., a cache management system that is integrated with a virtual machine) or a cache management system may be separate from the runtime system (e.g., a cache management system that was compiled with a program into bytecode and defined in a archive file compliant with the JAVA Archive file format, or as part of a JAVA package). Advantageously, if the cache management system is not integrated with a runtime system, the cache management system may be portable such that the cache management system can be used for different programs and run on different runtime systems. The cache management system may include a receiver for receiving requests to manage cache and may be able to manage entries in the cache (e.g., by enforcing a cache replacement scheme). Alternatively, the request may be received by something other than a cache management system. For example, the request may be received by a front-end to a cache management system, where the front-end receives requests and interacts with a cache management system to fulfill requests.

In response to receiving the request to store the first item in a cache, the first item is cached. Caching the first item involves updating a cache table to include the item in the cache table, setting a validity period, and associating a function with the first item (210). Updating the cache table may include adding a key, value pair corresponding to the first item. Setting a validity period may include setting a relative time at which the validity period should expire (e.g., 30 seconds from the time the item is cached). Associating a function with the first item may involve including a reference to the function in the cache entry corresponding to the first item. Advantageously, associating a function with the first item may make use of the cache easier, for example, for a user programmer who need not worry about instances where an item put in cache is no longer in cache, as the item is generated for the user programmer, in a process that is transparent to the user programmer.

Updating the cache may differ. As examples, updating the cache table may include adding a key, soft-reference pair corresponding to the first item, or generating a value corresponding to the item (e.g., if the key already exists and a function for generating the item is supplied). Setting a validity period may differ. For example, setting a validity period may include setting a timer that interacts with a runtime system scheduler, and, sleeps until the time expires. The cache table may include a reference to the timer such that the time remaining may be determined. The validity period need not be set in relative time. For example, absolute time may be used to set the validity period (e.g., a time in the format of system time at which a validity period expires). The validity period may be renewed, for example, for an item that is frequently referenced and is resource-intensive to compute. Validity periods for different items may vary.

In response to receiving a request to retrieve the first item from cache (215), a determination is made as to whether the first item is in cache (220). The first item might not be in cache, for example, if it has been purged as a result of a cache replacement scheme. If the first item is not in cache ("No"), the first item is generated (225). The first item may be generated by a function that is referred to in a cache entry corresponding to the first item. In addition, a cache table may be updated to reflect the first item being generated. For example, a cache entry corresponding to the first item may have a value field set to the value of the first item.

If the first item was in cache or the first item was generated, the first item is returned (230). Returning the first item may include returning a reference to the first item or the value of the first item.

After a validity period expires (235), the first item is purged from a cache (240). Purging the first item from the cache may include updating the cache table to reflect that the validity period has expired and indicating that the first item is invalid. Purging the first item from cache need not occur in response to the expiration of the validity period. For example, some time may pass before the validity periods of cache entries are checked and the first item is purged from the cache. Updating the cache table may include setting the value, for example, of the cache entry corresponding to the first item to "NULL." Indicating that the first item is invalid may include removing all references to the first item such that the first item may be picked up during a garbage collection.

After the first item has been purged from cache, the memory associated with the first item is freed (245). There need not be any connection between purging the item from cache and freeing the memory. In some implementations, the memory may be freed during a garbage collection process. In some implementations, the garbage collection process may be divided into a minor garbage collection process corresponding to a first generation of a heap and a major garbage collection process corresponding to a second generation of a heap. Items in the cache may initially be stored in the first generation and may be promoted to the second generation over time if they are still valid. To have the memory of many or all of the items of the cache freed during a minor garbage collection, as opposed to a major garbage collection, the time period of the validity period may be optimized such that cache entries tend to be purged before they may be promoted to the second generation. Thus, if minor garbage collection were to occur more frequently and require less resources to perform, optimizing the validity period may improve the performance of the cache by, as examples, clearing memory associated with cache entries more frequently while using less resources.

In various implementations, a number of accesses to a cached item may be tracked and, if a item has a corresponding timer that has expired, the cached item may be retained in the cache rather than purged if the number of accesses to the item exceeds a threshold number. This may, for example, assist in retaining frequently-accessed items in a cache such that those items are not computed often, which, in turn, may result in an efficient utilization of computer resources (e.g., a combination of memory and processor resources may be efficiently utilized).

Various implementations of the subject matter described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The subject matter described herein can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although, the subject matter described herein has been described in terms of particular embodiments, other embodiments can be implemented and are within the scope of the following claims. For example, the operations can differ and still achieve desirable results. For example, the operations of the flowchart illustrated in FIG. 2 that include storing a first item, updating a cache table, setting a validity period and associating a function may only include storing an item, updating a cache table, and setting a validity period. In certain implementations, multitasking and parallel processing may be preferable. Other embodiments are within the scope of the following claims.

What is claimed is:

1. A computer program product embodied on tangible storage media, the computer program product comprising instructions operable to cause data processing apparatus to:
   store a first item in a cache with an indication of a process to generate the first item;
   schedule a validity period for the first item, wherein:
      the validity period is optimized to be less than a period of time after which the first item would be promoted from a first generation of the cache to a second generation of the cache,
      invalid objects in the first generation of the cache are freed from memory more frequently than invalid objects in the second generation of the cache;
   track a number of accesses to the first item in the cache; and
   purge the first item from the cache when the validity period has expired and a number of accesses to the first item is below a threshold number.

2. The computer program product of claim 1, wherein the instructions to purge the first item from the cache comprise instructions to set a value associated with the cache entry to null.

3. The computer program product of claim 1, further comprising instructions to generate the first item if a cache entry associated with the first item indicates that the first item is not cached.

4. The computer program product of claim 1, further comprising instructions to determine whether the validity period has expired.

5. The computer program product of claim 1, wherein determining whether the validity period has expired comprises determining whether a first time has passed, the first time being associated with a time at which the validity period is scheduled to end.

6. The computer program product of claim 1, wherein the instructions to schedule a validity period comprise instructions to set a timer to indicate when to purge the first item from the cache, the validity period being a period from when the timer was set to a time when the timer expires.

7. The computer program product of claim 1, wherein the computer program product is a front-end to the cache.

8. The computer program product of claim 1, wherein the first item is a soft-reference to data.

9. The computer program product of claim 1, wherein the first item is a value.

10. The computer program product of claim 1, wherein the computer program product is compatible with the JAVA Archive file format.

11. A computer program product embodied on tangible storage media, the computer program product comprising instructions operable to cause data processing apparatus to:
   initiate storage of a first item in a cache with an indication of a process to generate the first item, wherein a validity period is associated with the first item and the validity period defines a time interval during which the first item is to be retained in the cache so long as there is sufficient free space available to retain the first item;
   track a number of accesses to the first item in the cache;
   purge the first item from the cache in response to a determination to purge the first item from the cache, the determination based on the expiration of the validity period and a number of accesses to the first item being below a threshold number wherein the validity period is optimized to be less than a period of time after which the first item would be promoted from a first generation of the cache to a second generation of the cache, and invalid objects in the first generation of the cache are freed from memory more frequently than invalid objects in the second generation of the cache.

12. The computer program product of claim 11, further comprising instructions to generate the first item if a cache entry associated with the first item indicates that the first item is not cached.

13. A computer program product embodied on tangible storage media, the computer program product comprising instructions operable to cause data processing apparatus to:
   store a first item in a cache with an indication of a process to generate the first item;
   schedule a validity period for the first item, wherein:
      the validity period is optimized to be less than a period of time after which the first item would be promoted from a first generation of the cache to a second generation of the cache,
      a minor garbage collection process frees invalid objects in the first generation of the cache from memory and a major garbage collection process frees invalid objects in both the first and second generations of the cache from memory, the minor garbage collection process occurring more frequently than the major garbage collection process, the major garbage collection process requiring more system resources than the minor garbage collection process and;
   purge the first item from the cache when the validity period has expired.

14. The computer program product of claim 13, wherein the cache is implemented to run in a JAVA Runtime Environment and the first generation of the cache corresponds to a new generation of heap memory and the second generation corresponds to an old generation of heap memory.

15. The computer program product of claim 13, further comprising instructions to generate the first item if a cache entry associated with the first item indicates that the first item is not cached.

16. The computer program product of claim 13, wherein the validity period defines a time interval during which the first item is to be retained in the cache so long as there is sufficient free space available to retain the first item, and the first item is purged from the cache in response to a determination to purge the first item from the cache.

* * * * *